July 19, 1927.
W. C. WILSON
MANUFACTURE OF FURANE
Filed Nov. 28, 1924
1,636,030
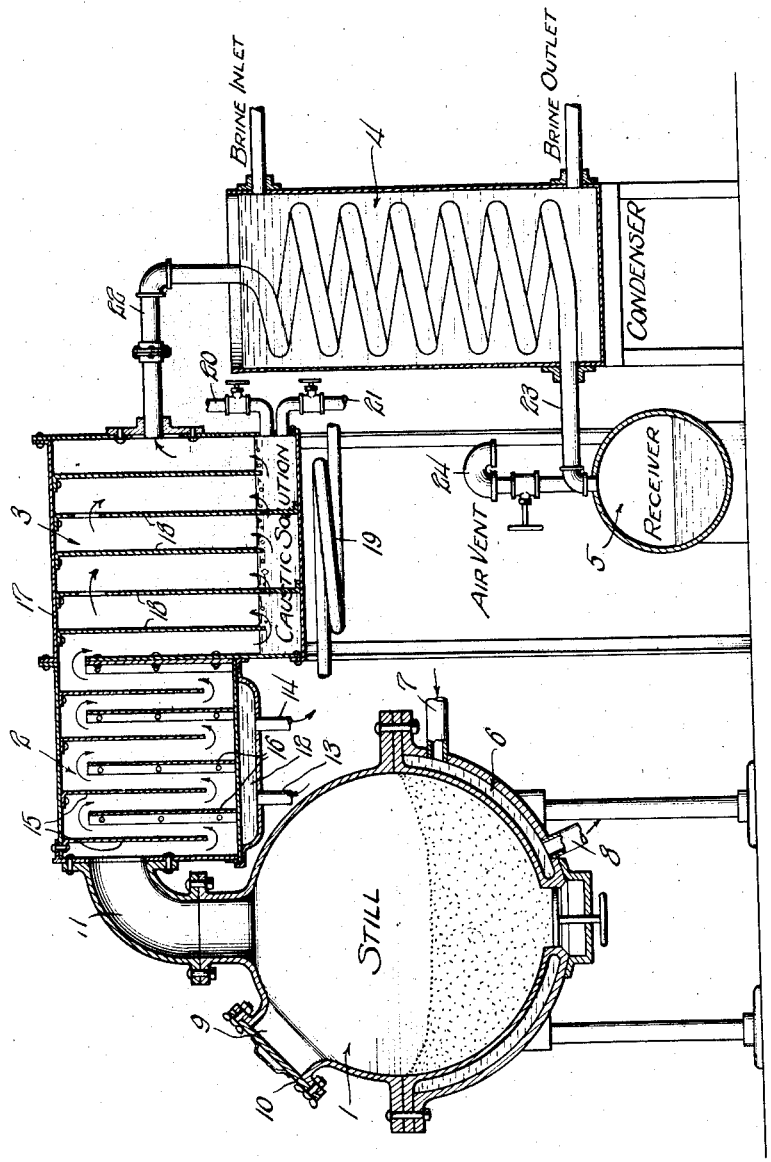
Inventor:
WILLIAM COURTNEY WILSON
By Jones, Addington, Ames, & Seibold
Attys.
Witness:

Patented July 19, 1927.

1,636,030

UNITED STATES PATENT OFFICE.

WILLIAM COURTNEY WILSON, OF CHICAGO, ILLINOIS, ASSIGNOR TO THE QUAKER OATS COMPANY, OF CHICAGO, ILLINOIS, A CORPORATION OF NEW JERSEY.

MANUFACTURE OF FURANE.

Application filed November 28, 1924. Serial No. 752,530.

This invention relates to improved processes and apparatus for manufacturing furalic substances and particularly furane. Furane has heretofore been obtained only as a laboratory product from furoic acid by a decomposition or breaking down of the acid into furane and other substances when subjected for a long period of time to high temperatures and pressures within a sealed tube. By this method, even with careful manipulation, it has been possible to obtain only small quantities of furane merely as an experimental result and at great expense.
This invention, accordingly, has for one of its objects the provision of a process for rapidly manufacturing furane in large quantities from furoic acid. A further object of this invention is to provide a process by which the furane may be removed from the region of the furoic acid substantially as soon as formed, whereby possible conditions inhibiting the progress of the reaction are obviated and whereby the reaction is permitted to proceed to a conclusion by which a much larger percentage of the acid is converted to furane than has been heretofore possible.

A further object of this invention comprises the provision of a relatively simple process and apparatus for the commercial production of furane at a cost such that this chemical may be made available for use for many purposes where its cost has heretofore been prohibitive.

Another object of this invention is to provide a method for the simultaneous production of furane and furoic acid in extremely pure form.
Further objects and advantages of the invention here disclosed will appear from the following specification and appended claims taken in connection with the accompanying drawing, which illustrates one embodiment of the apparatus in which the process of my invention may be carried out.

Furoic acid, even when only slightly heated at substantially atmospheric pressure, is subject to sublimation. This fact would lead to the belief that the furoic acid would largely or wholly become sublimed before being heated sufficiently to break down the acid into furane and carbon dioxide in the absence of pressures higher than atmospheric.

However, I have discovered that when furoic acid is heated to temperatures in the neighborhood of 200° to 250° C. and at atmospheric pressure, substantial quantities of the acid will decompose, evolving carbon dioxide gas and furane in the form of a vapor according to the following equation:

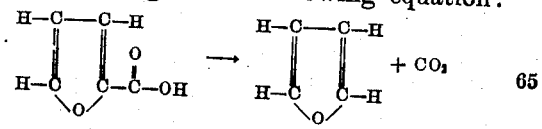

At the same time a portion of the furoic acid will vaporize but this result is not seriously objectionable in carrying out my process, since in accordance with my invention the vapors substantially as soon as formed will pass through a condensing chamber which is held at a temperature of about 40° C. In this chamber the furoic acid will condense and thus become separated from the other gases produced.

In accordance with my process, after the furoic acid is removed, the gases may be passed through a solution of a suitable chemical such as caustic soda, for the absorption of the carbon dioxide. The furane vapors may then be condensed to liquid form and collected in a receiver.

The sublimed furoic acid which is collected in the condensing chamber by the above process is very much purer than the furoic acid which may be used as the initial raw material for the process and it is possible to utilize initially a crude form of furoic acid and by suitable temperature and other control obtain furane and refined furoic acid in varying proportions, that is, this process may be operated so as to produce a major quantity of furane and a lesser quantity of sublimed furoic acid, or if desired it may be operated so as to produce a major quantity of sublimed furoic acid and a lesser quantity of furane.

It has been my observation that the percentage of furoic acid that is decomposed during the operation of my process depends to a large extent upon the length of time during which heated particles of the material remain in their heated condition. As an illustration, I have practiced my process by using a still in which to heat the furoic acid, such still being provided with a substantially horizontal or downwardly turned outlet conduit extending from a point very closely adjacent the surface of the furoic acid in the still. With the apparatus thus arranged, the gases and vapor freely and very rapidly flow from the still as formed and accordingly are not subjected to the temperature of the still for any appreciable period of time. Under such conditions, the major quantity of sublimed furoic acid and a lesser quantity of furane may be produced.

In the accompanying drawing, an apparatus is illustrated suitable for commercially carrying out the process of my invention. Although not limited to such use, this apparatus is particularly desirable for the production of a major quantity of furane by my process. Briefly, the apparatus may comprise a still 1, or vessel for receiving the furoic acid, a condensing chamber 2, a carbon dioxide absorber 3, a condenser 4, and a receiving tank 5.

The still 1 may comprise a tank or vessel of sufficient size for receiving a considerable quantity of the furoic acid crystals. As illustrated, the vessel may be partly or wholly surrounded by a steam jacket 6, provided with inlets and outlets as at 7 and 8, respectively. The vessel 1 may be provided with a suitable opening 9, through which the furoic acid may be introduced, and a cover 10 for such opening.

The vapors emitted from the still may pass through a passageway 11 to the condensing chamber 2. The condensing chamber is preferably provided with a cooling jacket 12 for maintaining the receiver at a temperature in the neighborhood of 40° C. Suitable inlets and outlets 13 and 14, respectively, are provided for the cooling fluid. The condensing chamber, as illustrated, may embody a tortuous passageway formed by a series of baffles as at 15 and 16. The sublimed furoic acid will gather upon the cold walls and baffle plates of the condensing chamber, whereas the remaining gases will pass on into the adjacent carbon dioxide absorber 3.

The carbon dioxide absorber, as illustrated, may comprise a receptacle 17 provided with a series of partitions as at 18, the lower edges of which are extended into a quantity of a solution such as caustic soda suitable for the absorption of carbon dioxide. As indicated by the arrows in the drawing, the gases entering the carbon dioxide absorber may be caused to bubble through the caustic solution at the lower edges successively of the partitions 18. The caustic solution may be maintained at a suitable temperature by means of a steam coil as illustrated at 19. Suitable inlets and outlets as at 20 and 21, respectively, may be provided for renewing the caustic solution.

The remaining gas comprising furane vapor is allowed to pass through a conduit 22 into the condenser 4, which may be of any suitable and well-known type or as illustrated. From the condenser 4 the liquid furane may be conducted through a conduit 23 into the receiving vessel 5. The vessel 5, if desired, may be provided with an air vent as at 24 in order that the process may be carried out at substantially atmospheric pressure.

With apparatus of the above described type, I have found that two hundred parts of commercial furoic acid of 95–96% purity will yield in the neighborhood of seventy-one parts of furane and twelve parts of sublimed furoic acid when heated to temperatures in the neighborhood of 200° C. for about one hour. Thus it will be seen that this invention provides a process for producing furane in commercial quantities and without the use of costly or complicated apparatus. The furane made available by this process is also of a high degree of purity.

Although the above description and the accompanying drawing merely disclose in detail one specific process and a single form of apparatus for carrying out the process embodying my invention, I desire that only such limitations be imposed upon my invention as are set forth in the appended claims. Certain features of the process may be altered within the scope of my invention in its broader aspects. For example, the furane vapor may be separated from the other gases formed by purifying processes other than that disclosed herein.

Having thus described my invention, what I claim as new and desire to secure by Letters Patent of the United States is:

1. A process for the production of furane which comprises heating furoic acid at substantially atmospheric pressure.

2. A process for the production of furane which comprises heating furoic acid at substantially atmospheric pressure and continuously removing the furane from the region of the acid.

3. The process of manufacturing furane which comprises breaking down furoic acid to furane by means of heat at substantially atmospheric pressure and separating furane from the resulting reaction products.

4. The process of manufacturing furane which comprises heating furoic acid at substantially atmospheric pressure to a temperature in the neighborhood of 200° C. or more and separating furane vapor from the resulting reaction products.

5. A chemical process which comprises heating furoic acid in a vessel to a temperature sufficient to cause decomposition thereof into furane and carbon dioxide, and allowing the gases formed to continuously pass from the vessel.

6. A chemical process which comprises heating furoic acid in a vessel to a temperature sufficient to cause decomposition thereof into furane and carbon dioxide, and allowing the gases formed to continuously pass from the vessel through a carbon dioxide absorbing material.

7. The process of manufacturing furane which comprises first heating furoic acid in a vessel at substantially atmospheric pressure to a temperature sufficient to cause decomposition of a portion thereof into furane, passing the gases formed through a condensing chamber whereby sublimed furoic acid is deposited in the chamber, and also treating the gases with a chemical for the absorption of carbon dioxide therefrom.

8. The process of manufacturing furane which comprises first heating furoic acid in a vessel at substantially atmospheric pressure to a temperature in the neighborhood of 200° C. or more, allowing the gases formed to continuously pass from the vessel, and through a bath of a solution for the absorption of carbon dioxide therefrom, and finally condensing the furane vapor.

9. The process of manufacturing furane which comprises first treating furoic acid in a vessel to cause furane vapor to be evolved, allowing the gases formed to continuously pass from the vessel, passing the gases through a condensing chamber whereby sublimed furoic acid is deposited in the chamber, and also passing the gases through a bath of a material for the absorption of carbon dioxide therefrom, and finally condensing the furane vapor.

10. The process of manufacturing furane which comprises first heating furoic acid in a vessel to a temperature in the neighborhood of 200° C. or more, allowing the gases formed to continuously pass from the vessel, passing the gases through a condensing chamber whereby sublimed furoic acid is deposited in the chamber, and also passing the gases through a bath of a solution for the absorption of carbon dioxide therefrom, and finally condensing the furane vapor.

11. The process of manufacturing furane which comprises first heating furoic acid in an enclosed vessel at substantially atmospheric pressure to a temperature in the neighborhood of 200° C. or more, allowing the gases formed to continuously pass from the vessel, then passing the gases through a condensing chamber whereby sublimed furoic acid is deposited in the chamber, then passing the remaining gases through a bath of caustic solution for the absorption of carbon dioxide therefrom, and finally condensing the furane vapor.

12. A chemical process which comprises heating furoic acid to a temperature sufficient to cause sublimation and decomposition of a portion thereof, and passing the gases formed through a condensing chamber whereby substantially pure furoic acid is deposited within said chamber.

13. A process of obtaining furane and substantially pure furoic acid which comprises heating furoic acid in a vessel to a temperature sufficient to cause decomposition of a portion thereof and allowing the gases formed to continuously pass from the vessel through a condensing chamber where purified furoic acid is deposited.

In witness whereof, I have hereunto subscribed my name.

WILLIAM COURTNEY WILSON.